United States Patent [19]
Yamanaka et al.

[11] Patent Number: 5,233,368
[45] Date of Patent: Aug. 3, 1993

[54] RECORDING APPARATUS HAVING ALTERABLE RECORDING DENSITY

[75] Inventors: Toshihisa Yamanaka, Machida; Tatsuya Eguchi, Toyohashi, both of Japan

[73] Assignee: Minolta Camera Kabushiki Kaisha, Osaka, Japan

[21] Appl. No.: 947,043

[22] Filed: Sep. 18, 1992

[30] Foreign Application Priority Data

Sep. 26, 1991 [JP] Japan .................. 3-247403

[51] Int. Cl.⁵ .......................... G03G 15/04
[52] U.S. Cl. .......................... 346/108; 358/298
[58] Field of Search ............. 346/108; 358/296, 298, 358/300, 302; 359/204

[56] References Cited

U.S. PATENT DOCUMENTS

| | | | |
|---|---|---|---|
| 3,970,845 | 7/1976 | Hollis | 250/214 |
| 4,178,064 | 12/1979 | Mrdjen | 350/6.6 |
| 4,393,387 | 7/1983 | Kitamura | 346/108 |
| 4,616,132 | 10/1986 | Kessler | 250/236 |
| 4,940,310 | 7/1990 | Hamada | 250/236 |
| 5,153,604 | 10/1992 | Tutiyasu | 346/108 X |

FOREIGN PATENT DOCUMENTS 3-167570  7/1991  Japan .

*Primary Examiner*—Joan H. Pendegrass
*Attorney, Agent, or Firm*—Price, Gess & Ubell

[57] ABSTRACT

A recording apparatus having an alterable recording density includes two laser diodes, the first laser diode having its beam intensity altered in accordance with a recording density, the second laser diode having its beam intensity constant independently of the recording density. An SOS sensor is provided to detect laser beams for obtaining a horizontal synchronizing signal to be a reference of timing to start image writing. The SOS sensor is always irradiated by the second laser diode.

7 Claims, 10 Drawing Sheets

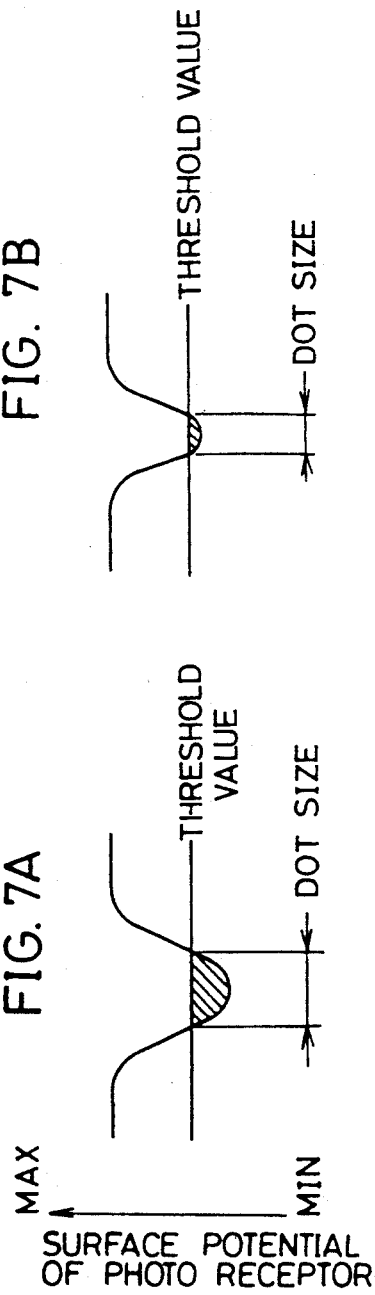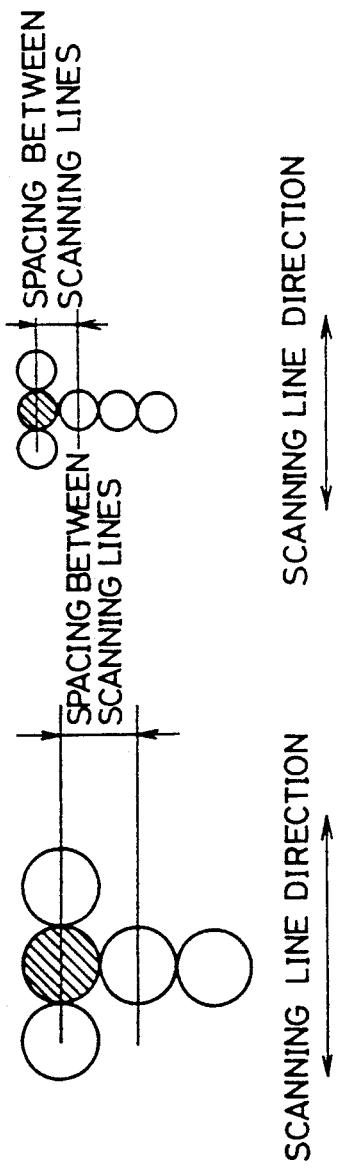

RECORDING APPARATUS HAVING ALTERABLE RECORDING DENSITY

BACKGROUND OF THE INVENTION

1. Field of the Invention

The present invention relates generally to recording apparatuses and, more particularly, to a recording apparatus including a laser beam scan optical device and having a recording density alterable by changing the intensity of a laser beam.

2. Description of the Related Art

Recently, as recording apparatuses such as of laser beam printers and facsimile devices, various apparatuses incorporating laser beam scan optical devices for use in image writing have been proposed. In such a laser beam scan optical device, a laser beam emitted from a light source (mainly a semiconductor laser) is deflected within one plane by a deflector (a polygon mirror, hologram scanner, galvano mirror or the like), then guided onto a photoreceptor being a recording medium via an f-$\theta$ lens, a reflecting mirror or the like and is imaged. During this process, a part of the laser beam irradiates a light receiving element (hereinafter referred to as an SOS sensor), whereby a formed signal showing the position to start image printing on each scanning line (hereinafter referred to as a horizontal synchronizing signal) is obtained. After a certain period of time has passed since this horizontal synchronizing signal was output, a writing of image information onto the photoreceptor is started, thereby synchronizing respective lines. Also, as the above-described recording apparatus, such a recording apparatus has been proposed that an image having a different recording density can be reproduced with a change in the density of dots imaged on a photoreceptor by changing the intensity of a laser beam.

FIG. 11 is a diagram showing the intensities of beam incident on the SOS sensor and a horizontal synchronizing signal generated by each beam. As shown in FIG. 11, differences in the intensities of the laser beams directed to the SOS sensor cause differences in output waveforms of the SOS sensor and a deviation in the horizontal synchronizing signal.

More specifically, an output of the SOS sensor has waveforms which are different in rising and falling due to the difference in beam intensities, as shown in FIG. 11 (a). Even if this signal is shaped at a predetermined threshold value in order to obtain a horizontal synchronizing signal, deviations $\delta1$ and $\delta2$ occur in the horizontal synchronizing signal due to the difference in beam intensities, as shown in FIG. 11 (b). Thus, when image writing is started after a certain period of time, with the rising or falling of the horizontal synchronizing signal being set as a reference, for example, a so-called printing deviation corresponding to the deviation $\delta1$ or $\delta2$ is produced. Alternatively, even if a middle point between the rising and the falling of the horizontal signal is set as a reference, a printing deviation is produced corresponding to $(\delta1+\delta2)/2$ due to the difference between $\delta1$ and $\delta2$. Accordingly, in a recording apparatus having a recording density variable by a variation in beam intensity, the positions for image writing are not uniformed, thereby causing.

SUMMARY OF THE INVENTION

One object of the present invention is therefore to obtain an image of high quality in a recording apparatus employing laser beams having different beam intensities.

Another object of the present invention is to prevent a printing deviation in a recording apparatus employing laser beams having different beam intensities.

A further object of the present invention is to prevent a printing deviation even if a recording density is changed in a recording apparatus using laser beams having different beam intensities.

The foregoing objects of the present invention can be accomplished by making uniform the beam intensities of laser beams for obtaining a reference of timing to start image writing independently of recording densities. That is, since a variation in recording density does not bury the beam intensity, a horizontal synchronizing signal for detecting the position to start image writing does not deviate for each scanning line. As a result, an image of high quality is ensured in the recording apparatus using laser beams having different beam intensities.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A, 7B, 7C and 7D are diagrams showing relationships between an image density and a beam intensity.

DESCRIPTION OF THE PREFERRED EMBODIMENTS

Embodiments of a recording apparatus in accordance with the present invention will now be described with reference to the appended drawings.

Figure 1:
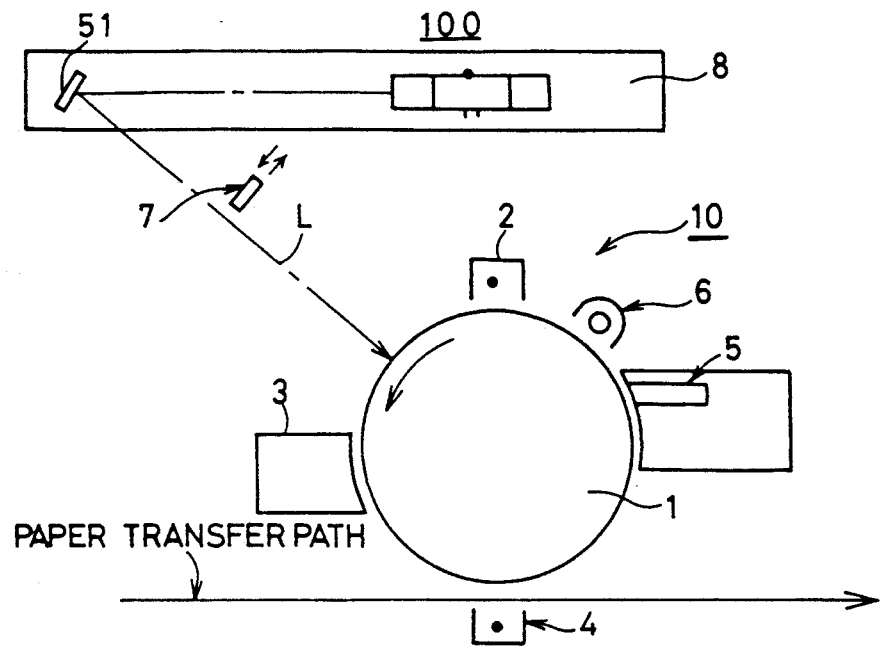
FIG. 1 is a diagram showing a schematic structure of a laser beam printer according to the present invention.

With reference to FIG. 1, a laser beam printer 100 schematically includes a scanning optical unit 8 as a laser beam scan optical device and an engine unit 10. The engine unit 10 includes a photoreceptor drum 1, and a corona charger 2, a developing device 3, a transfer charger 4, a cleaning device 5, an eraser lamp 6 and the like provided on the photoreceptor drum 1. The scanning optical unit 8 includes a laser unit, a polygon mirror, an f-θ lens and a reflecting mirror 51 which will be described later.

Figure 2:
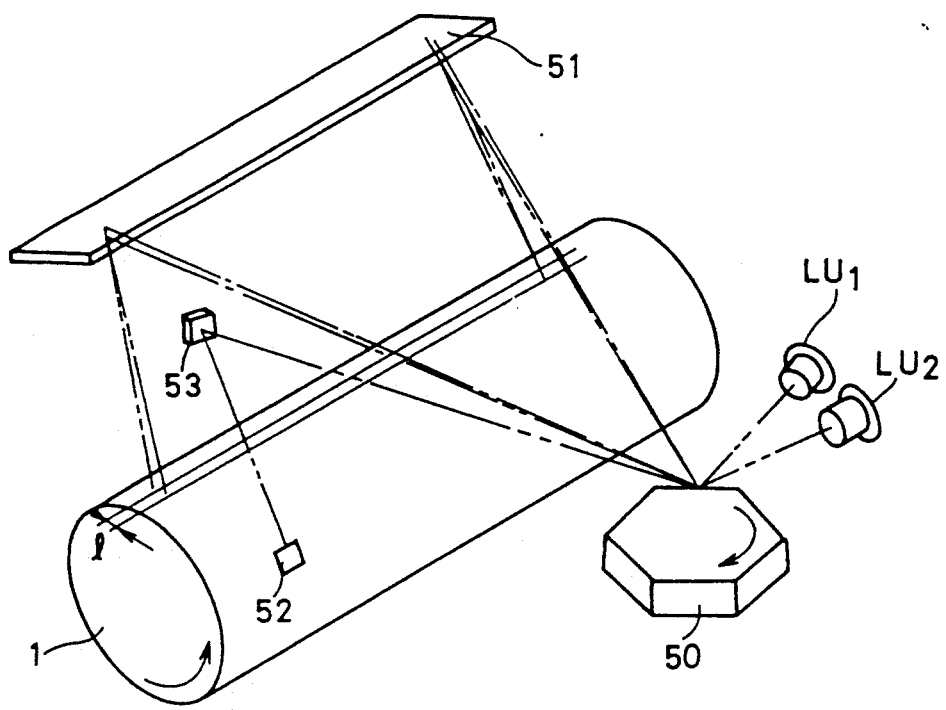
FIG. 2 is a perspective view showing a relationship between a scanning optical unit and a photoreceptor according to a first embodiment.

Along an optical path L extending from the reflecting mirror 51 to the photoreceptor 1, a laser beam front shutter 7 is disposed which is movable between a position st which the shutter enters for entry into the optical path L and a position st which the shutter saves from the optical path L. This laser beam front shutter 7 is utilized in setting the intensity of light emitted from a laser diode. This will be described later FIG. 2 is a perspective view showing a relationship between the scan optical unit 8 and the photoreceptor 1.

In this embodiment, the laser beam printer 100 is able to make printing at a high density (600dpi) and at a low density (300dpi). The laser beam printer 100 includes a first laser unit LU1 comprised of a laser diode and a collimator lens as a light source, and a second laser unit LU2. A first beam emitted from the first laser unit LU1 and a second beam from the second laser unit LU2 are both deflected by a polygon mirror 50 which rotates at a definite speed, then reflected via the f-θ lens not shown by the reflecting mirror 51 and directed onto the photoreceptor drum 1 being driven to rotate. A spacing 1 between a scanning line of the first beam and that of the second beam on the photoreceptor drum 1 is 1/600 inches, i.e., corresponding to a spacing between scanning lines during a high density printing.

In addition, an SOS sensor 52 for detecting a laser beam in order to obtain a horizontal synchronizing signal to be a reference of timing to start image writing is provided at a position where the SOS senser receives light reflected from a reflecting mirror 53 disposed on an optical path of the second beam emitted from the second laser unit LU2. That is, the SOS sensor 52 receives the second beam which is forcibly emitted to scan over a non-image area on an upper stream side of a main scanning direction of laser beams. An output from the SOS sensor 52 (hereinafter referred to as the SOS output) is input to a waveform shaping circuit 110 which will be described later, and the waveform of the SOS output is shaped by the waveform shaping circuit 110. This results in a horizontal synchronizing signal HS which will be described later. After a predetermined period of time has passed since generation of this horizontal synchronizing signal HS, the first and second beams are modulated in accordance with an image signal, so that image writing on the photoreceptor drum 1 is started. Accordingly, the positions to start image writing of the respective scanning lines are matched with each other.

Figure 3:
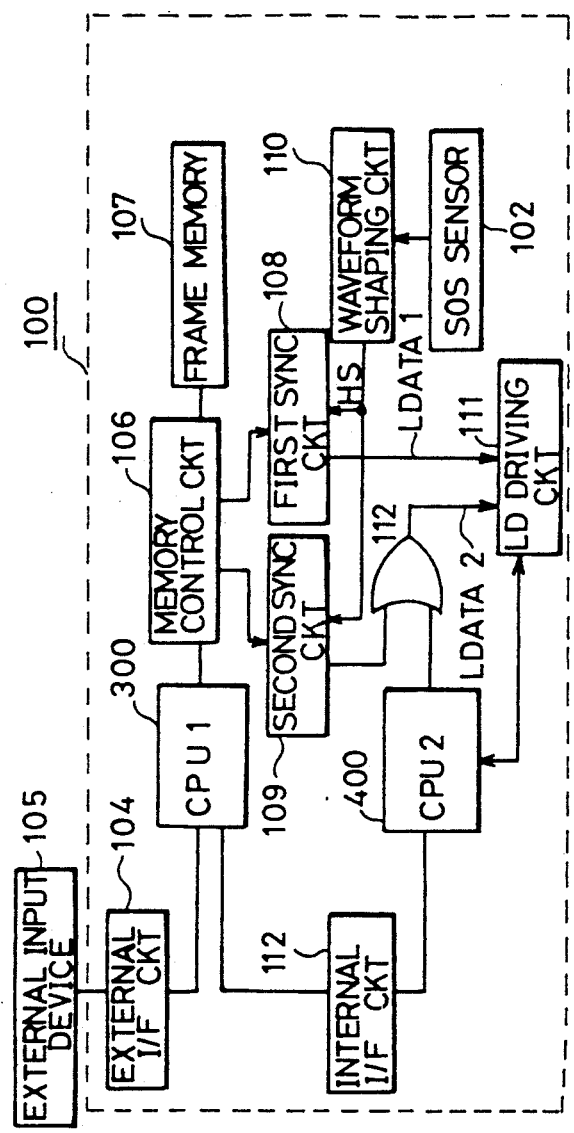
FIG. 3 is a schematic diagram showing circuitry of a control unit of the laser beam printer.

FIG. 3 is a block diagram schematically showing a control unit of the laser beam printer 100. The laser beam printer 100 is connected via an external I/F circuit 104 to an external input device 105 being a host computer of a word processor, a personal computer or the like. Image data to be printed which is applied from the external input device 105 is analyzed by a first CPU 300 and then converted into binary data which corresponds to image dots and can be printed by the printer. The converted image data is stored via a memory control circuit 106 into a frame memory 107 which is able to store image data of one page. With the image data of one page stored into the frame memory 107, the memory control circuit 106 reads image data from the frame memory 107 to a first synchronizing circuit 108 and a second synchronizing circuit 109 in accordance with a print density. That is, in low density printing, the memory control circuit 106 reads image data of one scanning line onto the first synchronizing circuit 108, and when a printing of one scanning line is completed, the memory control circuit 106 reads image data of a subsequent scanning line onto the first synchronizing circuit 108. With repetition of this operation, the image data of one page is read out.

On the other hand, in high density printing, the memory control circuit 106 reads image data of one scanning line onto the first synchronizing circuit 108 and also reads image data of the next scanning line onto the second synchronizing circuit 109. By sequentially reading the image data of two lines, the memory control circuit 106 reads image data of all of one page.

The image data read onto the first and second synchronizing circuits 108 and 109 are synchronized with a dot clock responding to the horizontal synchronizing signal HS from the waveform shaping circuit 110, and then transmitted as a first image signal LDATA1 and a second image signal LDATA2 to a laser diode driving circuit (hereinafter referred to as the LD driving circuit) 111. In the LD driving circuit 111, first and second laser diodes LD1 and LD2 (see FIG. 4) are modulated in response to the image signals LDATA1 and LDATA2 from the first and second synchronizing circuits 108 and 109.

The first CPU300 is connected via an internal I/F circuit 112 to a second CPU 400 for controlling the engine unit 10 which carries out an electrophotographic process. The second CPU 400 outputs control signals for controlling the beam intensities of the first and second laser diodes LD1 and LD2 to the LD driving circuit 111, and the second CPU 400 is also supplied with signals indicating the beam intensities of the first and second laser diodes LD1 and LD2 by the LD driving circuit 111. In addition, the second CPU 400 outputs a forcibly emitted signal for detection of an SOS signal via an OR circuit 112 to the LD driving circuit 111, at timing in which the laser beams pass the SOS sensor 52.

The output signal is independent of an image signal of the second laser diode LD2.

Figure 4:
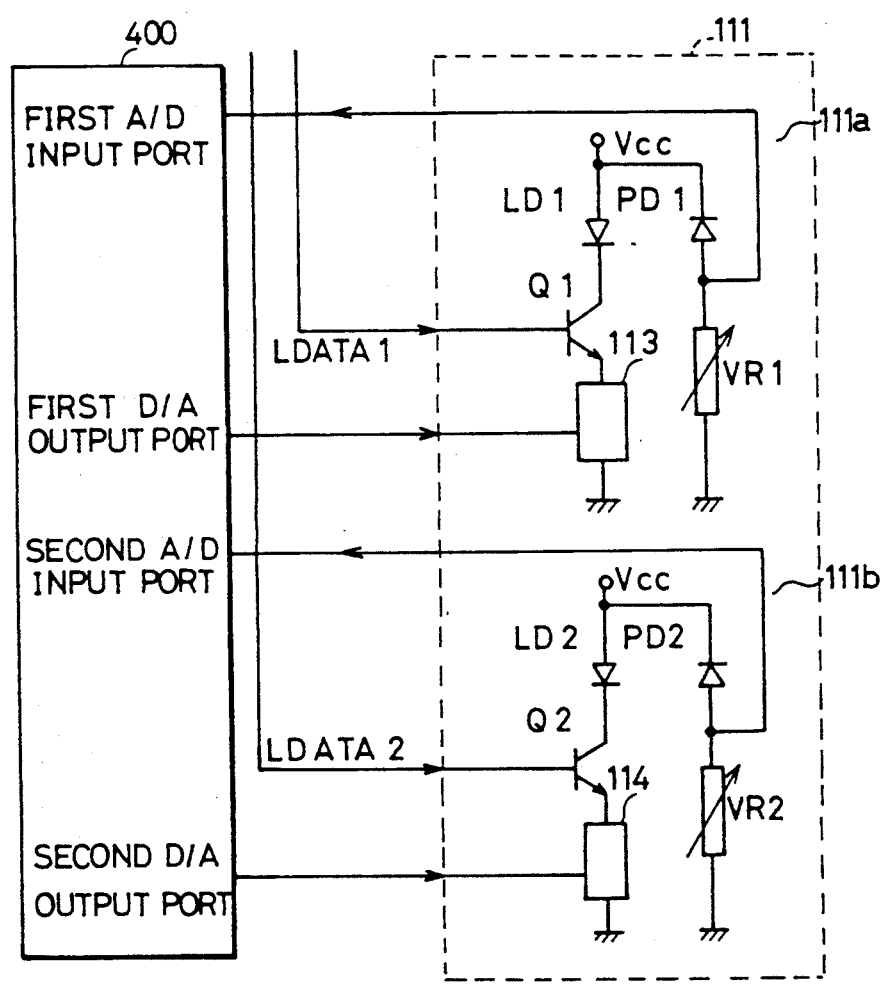
FIG. 4 is a schematic diagram showing a laser diode driving circuit.

FIG. 4 is a schematic diagram of the LD driving circuit 111. The LD driving circuit 111 includes a first driving circuit 111a and a second driving circuit 111b for driving the first and second laser diodes LD1 and LD2, respectively. The first image signal LDATA1 transmitted from the first synchronizing circuit 108 is input to a base of a first transistor Q1 for turning the first laser diode LD1 on/off. When the first transistor Q1 is rendered conductive, a supply voltage Vcc is applied to the first laser diode LD1, so that the first laser diode LD1 emits lights. Similarly, in the second driving circuit 111b, the second laser diode LD2 emits light in response to the second image signal LDATA2. Currents for allowing the first and second laser diodes LD1 and LD2 to emit light are controlled by first and second current control circuits 113 and 114, respectively. The first and second current control circuits 113 and 114 control driving currents for allowing the first and second laser diodes LD1 and LD2 to emit light, respectively, in accordance with count values of first and second D/A outputs ports of the second CPU 400. The respective beam intensities of the first and second laser diodes LD1 and LD2 are monitored by first and second pin photodiodes PD1 and PD2, respectively. Outputs from the pin photodiodes PD1 and PD2 are input to first and second A/D input ports of the second CPU 400, respectively. That is, the second CPU 400 changes the count values of the first and second D/A output ports so that the count values of the first and second A/D input ports indicating the beam intensities of the first and second laser diodes LD1 and LD2 be within a predetermined range, thereby controlling the beam intensities of the first and second laser diodes LD1 and LD2.

Figure 5:
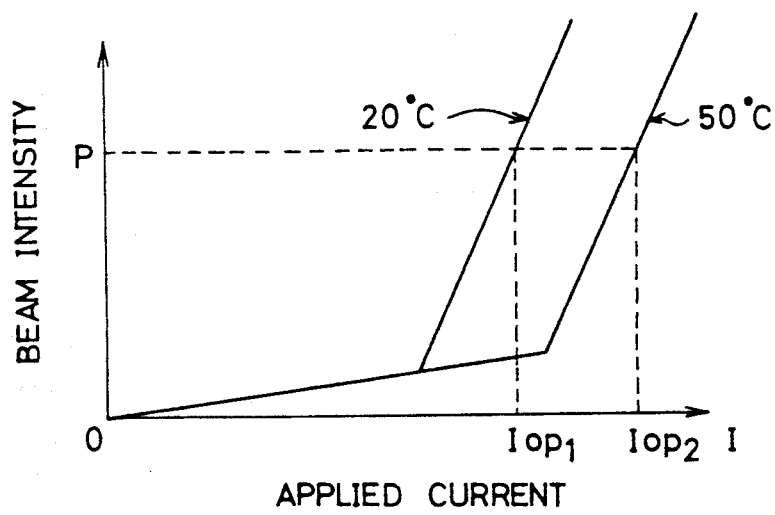
FIG. 5 is a diagram showing a temperature dependence of a laser diode.
Figure 6A:
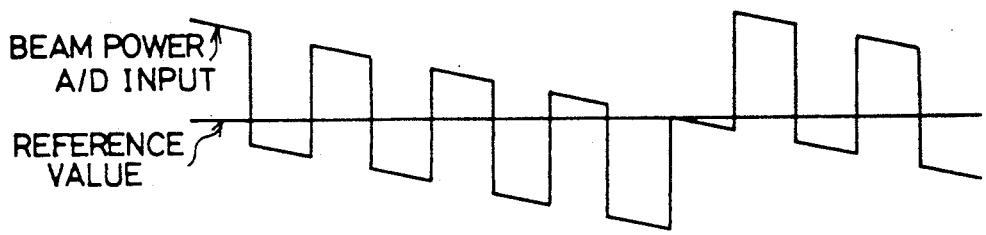
FIGS. 6A and 6B are diagrams for use in explaining a reference range.
Figure 6B:
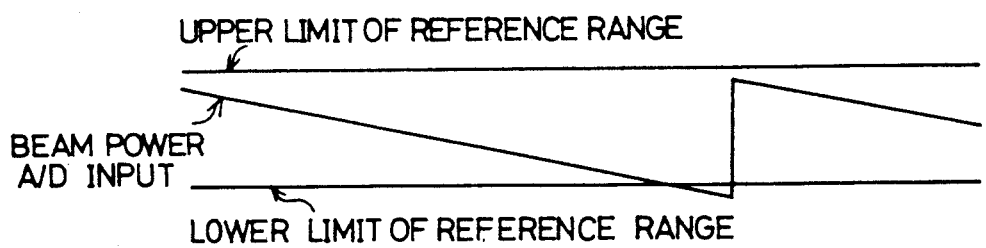

FIG. 5 shows temperature dependence of a laser diode. In FIG. 5, a longitudinal axis represents a beam intensity, and a horizontal axis represents an applied current. As shown in FIG. 5, when the temperature of the laser diode increases, a larger current than a current applied at the time of a low temperature is necessary in order to maintain the beam density at a predetermined reference value P. In this embodiment, when the temperature of the laser diode increases by printing, the count value of a D/A output port is counted up and a current larger than that in the case with a low temperature is supplied to the laser diode, in order to maintain a constant beam intensity. However, if a reference value is a constant unitary value, the count value of the D/A output port is repeated to be countered up/down from the reference value, and hence, the waveform of an input to an A/D input port is a rectangular wave as shown in FIG. 6A. Accordingly, even if the count value of the D/A output port is maintained, it is unclear whether the count value is maintained above or below the reference value, and an error of one step of the count value of the D/A output port occurs in the beam intensity, resulting in a deterioration in image quality such as a variation of printing density. Thus, as shown in FIG. 6B, a reference range is set to be slightly smaller than the beam intensity which is altered by one step of the count value of the D/A output port, and the set reference range is compared with the input waveform of the A/D input port, whereby the error of one step of the count value of the D/A output port is removed.

In this embodiment, first and second reference ranges are set as the beam intensity of the first laser unit LU1, and a third reference range is set as the beam intensity of the second laser unit LU2. The first reference range is a setting range for high density printing, the second reference range is for low density printing, and the third reference range is for both high density printing and SOS signal detection. That is to say, the first and third reference ranges are the same setting range (a low intensity), and the second reference range is set to a higher count value (a large intensity) in the D/A output port than the first or third reference range.

A description will now be made on an operation of the first laser unit LU1 and the second laser unit LU2 in each of low density printing and high density printing.

In low density printing, an image signal is read one by one scanning line from the frame memory 107 and transmitted only to the first laser unit LU1. The modulated image signal is written on the photoreceptor 1 with a first beam. At that time, the first beam is emitted with an intensity within the second reference range. The second laser unit LU2 is used for detection of an SOS signal, and the second beam is emitted in the third reference range.

In high density printing, an image signal is sequentially read two by two scanning lines from the frame memory 107, and image writing of each scanning line is carried out with the first and second beams from the first and second laser units LU1 and LU2. At this time, the intensities of light emission of the respective beams are within the first and third reference ranges, respectively. In both of the low density printing the high density printing, only the second beam which is emitted with a low intensity is employed in forcible emission for obtaining the SOS signal.

FIGS. 7A, 7B, 7C and 7D are diagrams showing reasons why the beam intensities in image writing are altered between the low density printing and the high density printing. FIG. 7A is a diagram showing potential distribution of a photoreceptor surface potential in a case where a laser beam directed onto the photoreceptor has a high beam intensity, and FIG. 7B is a diagram showing potential distribution of the photoreceptor surface potential in a case where the laser beam directed onto the photoreceptor has a low beam intensity. By a comparison between FIGS. 7A and 7B, it is found that a dot size becomes increased as the beam intensity becomes increased. FIG. 7C is a diagram showing a desired dot size in the case with low density printing, and FIG. 7D is a diagram showing a desired dot size in the case with high density printing. In the low density printing in which a spacing between scanning lines is large (see FIG. 7C), a high beam intensity is required which causes so large a dot size as to fill the spacing between scanning lines. In the high density printing in which the spacing between scanning lines is small (see FIG. 7D), if the beam intensity is too high, the dots of adjacent scanning lines are overlapped with each other, thereby causing image deviationing. Accordingly, in the high density printing, lower beam intensity is required as compared to the case with low density printing. A threshold value indicated in FIGS. 7A and 7B represents a threshold value of a potential provided when a developing agent adheres onto the photoreceptor. With this threshold value, the developing agent adheres onto the photoreceptor surface of a low potential.

Figure 8:
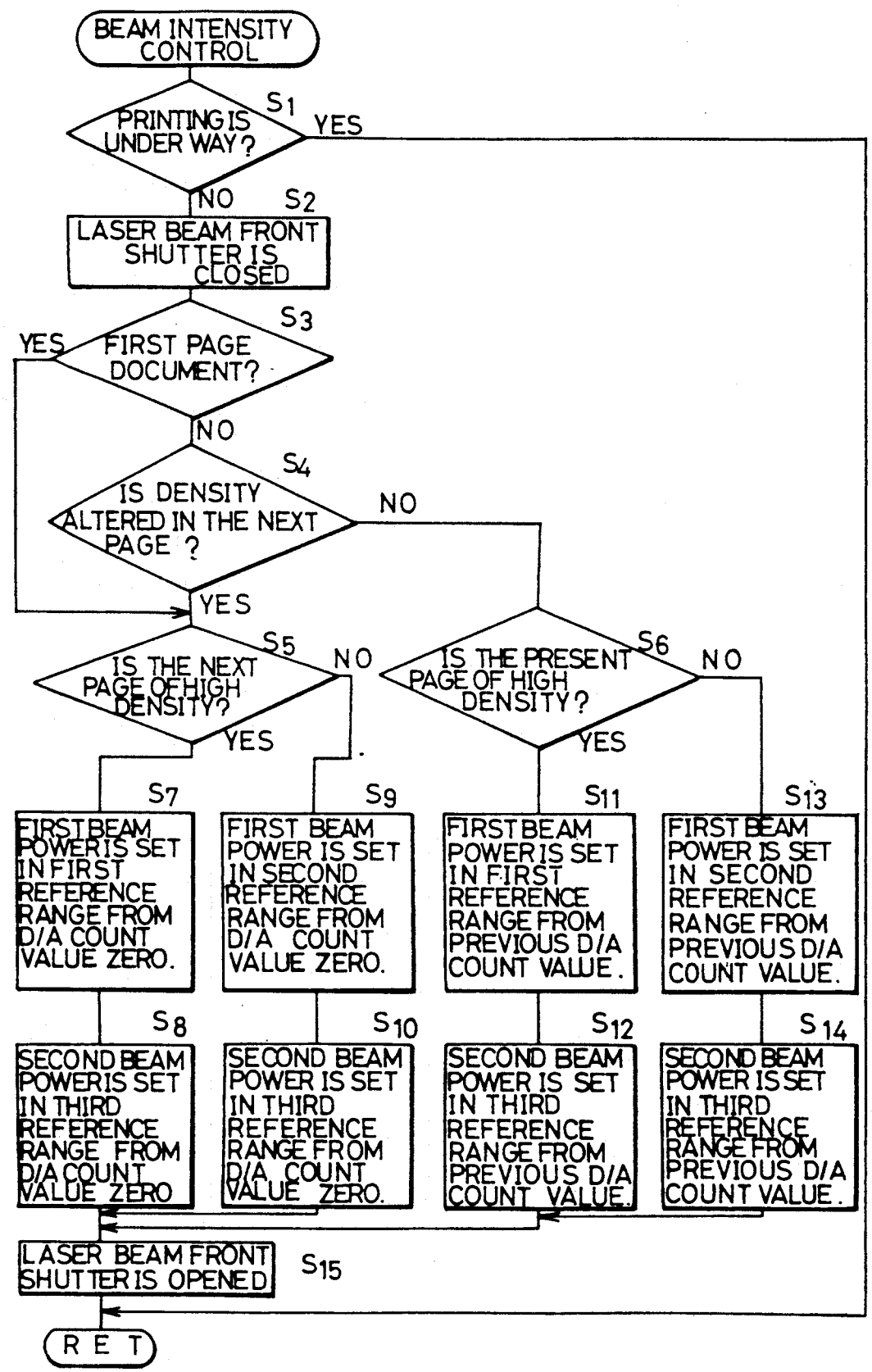
FIG. 8 is a flow chart showing a procedure for control of the beam intensity.

FIG. 8 is a flow chart showing a procedure for controlling the beam intensities of the first and second laser diodes LD1 and LD2 in the second CPU 400.

First, it is determined whether printing is now under way or not (a step S1). If the printing operation is not carried out (step S1:NO), i.e., if it is before printing of a first page of an image to be printed and between pages (hereinafter referred to as the non-image area), the laser beam front shutter 7 is closed to intercept an optical path so as not to allow a laser beam to reach the photoreceptor 1 (a step S2). The laser beam front shutter 7 is closed in order to prevent the phenomenon that the photoreceptor 1 is exposed and toner adheres to the photoreceptor unlessly since the laser beam is emitted in the non-image area in a beam intensity setting processing which will be described below.

When an image of the first page to be printed is of high density (a step S3:YES, a step S5:YES), or when there is an alteration from low density printing to high density printing (step S3:NO, a step S4:YES, step S5:YES), a count value of the first D/A output port is counted up from zero in turn and the first laser diode LD1 is emitted, so as to gradually increase the beam intensity. At the time when a count value of the first A/D input port indicating the beam intensity of the first laser diode LD1 is set within the first reference range being a desired beam intensity in the high density printing, the count value of the first D/A output port is maintained (a step S7). Similarly, a count value of the second D/A output port is counted up from zero in turn, and the beam intensity of the second laser diode LD2 is set in the third reference range being a desired beam intensity in the high density printing (a step S8).

When the image of the first page to be printed is of low density (step S3:YES, step S5:NO), or when there is an alteration from high density printing to low density printing (step S3:NO, step S4:YES, step S5:NO), the count values of the first and second D/A output ports are counted up from zero in turn. Then, at the time when the count values of the first and second A/D input ports indicating the beam intensities of the first and second laser diodes LD1 and LD2 are set in the second and third reference ranges being a desired beam intensity in the low density printing, the count values of the first and second D/A output ports are maintained (a step S9, a step S10).

The count value of each D/A output port is gradually counted up from zero in order to prevent breakage of the laser diodes LD1 and LD2. That is to say, when there is a large difference between the temperature of each of the laser diodes LD1 and LD2 at present time and the temperature of each diode during printing of a previous page, if an excess current is supplied at one time to the laser diodes, the laser diodes are broken down.

When there is no change in printing density (step S4:NO), the beam intensities of the first and second laser diodes LD1 and LD2 are reset again for printing of the next page. In this case, since there may not be a large difference between the temperatures of the laser diodes LD1 and LD2 at present time and the temperature of the laser diodes during printing of the previous page, the count values of the first and second D/A output ports which have been set in the previous printing are increased or decreased. At the time when the count values of the first and second A/D input ports are set in a reference range being a beam intensity of a desired printing density, the count values of the first and second D/A output ports are maintained (steps S11 to S14).

With the above processings completed, the laser beam front shutter 7 is opened (a step S15) for preparation of printing.

Figure 9A:
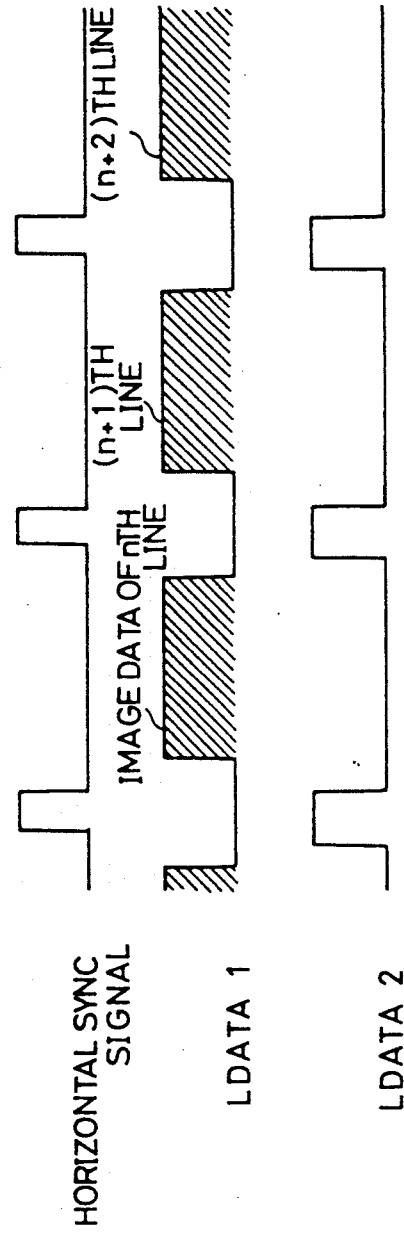
FIGS. 9A and 9B are signal waveform diagrams of respective signals of a first synchronizing circuit, a second synchronizing circuit and a waveform shaping circuit.
Figure 9B:
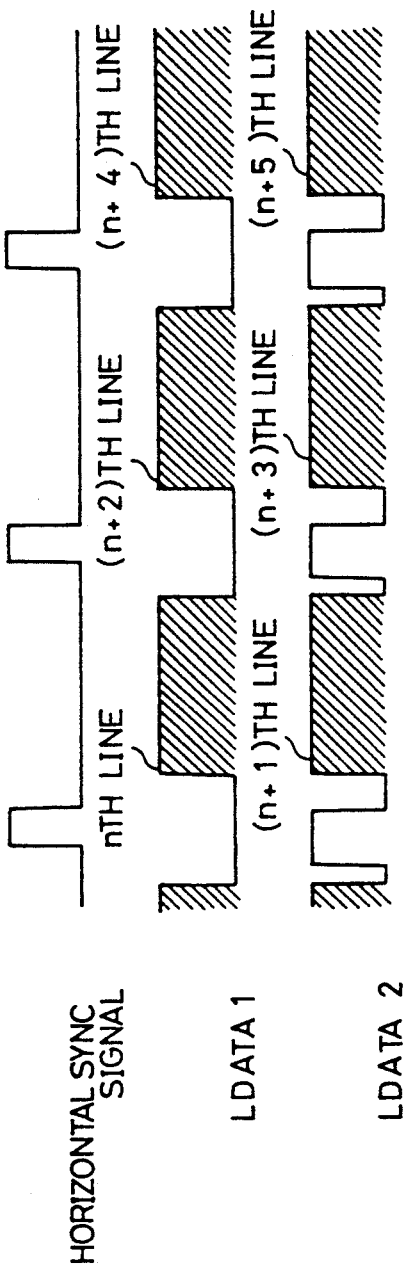

FIGS. 9A and 9B are signal waveform diagrams of respective signals generated from the first synchronizing circuit 108, the second synchronizing circuit 109 and the waveform shaping circuit 110 during printing processing. The first and second laser diodes LD1 and LD2 are modulated by the first and second image signals LDATA1 and LDATA2, respectively, with the beam intensities set in the process of FIG. 8. FIG. 9A shows the case with low density printing in which only an image signal is generated from the first image signal LDATA1 and only a forcibly emitted signal for detection of an SOS signal is generated from the second image signal LDATA2. FIG. 9B shows the case with high density printing in which only an image signal is generated from the first image signal LDATA1 and both an image signal and a forcibly emitted signal for obtaining an SOS output are generated from the second image signal LDATA2. As will be apparent from FIG. 9B, in the case with high density printing, an image of an nth line and an image of a (n+1) th line are printed at the same time. This is made possible since this embodiment includes two synchronizing circuits and thus image data of two lines can be read simultaneously. Simultaneous printing of an image of two lines makes it possible to avoid a decrease in printing speed during high density printing.

As described above, in this embodiment, a unitary SOS sensor is irradiated with a beam of a definite intensity irrespective of recording densities, a horizontal synchronizing signal is input to both the first and second synchronizing circuits 108 and 109, so as to control the first and second laser diodes LD1 and LD2. Accordingly, an image of high quality is ensured without causing any deviation in the position to start image writing due to an error of the SOS sensor.

Moreover, in this embodiment, an alteration of dot densities in a sub-scanning direction is made by used of one or two laser diodes. Thus, the alteration of dot densities is not time-consuming, resulting in an increase in printing speed.

Further, in this embodiment, since switching of the intensities of laser beams is made only for the first laser diode, a structure for intensity control is simple and a stable output is obtained. Also, since the second laser diode having a definite beam intensity irradiates the SOS sensor irrespective of recording densities, and occurrence of jitter can be avoided.

While an alteration of image densities is made in the units of page in the foregoing first embodiment, an alteration of printing densities may be made in the same page. In that case, an alteration of beam intensities may be made while beams are irradiating a non-image area in the main scanning direction.

While such an example has been described in the first embodiment that the present invention is applied to the laser beam printer for altering dot densities by use of two laser diodes, a description will now be made on a second embodiment in which the present invention is applied to a laser beam printer for altering dot densities by use of one laser diode.

Figure 10:
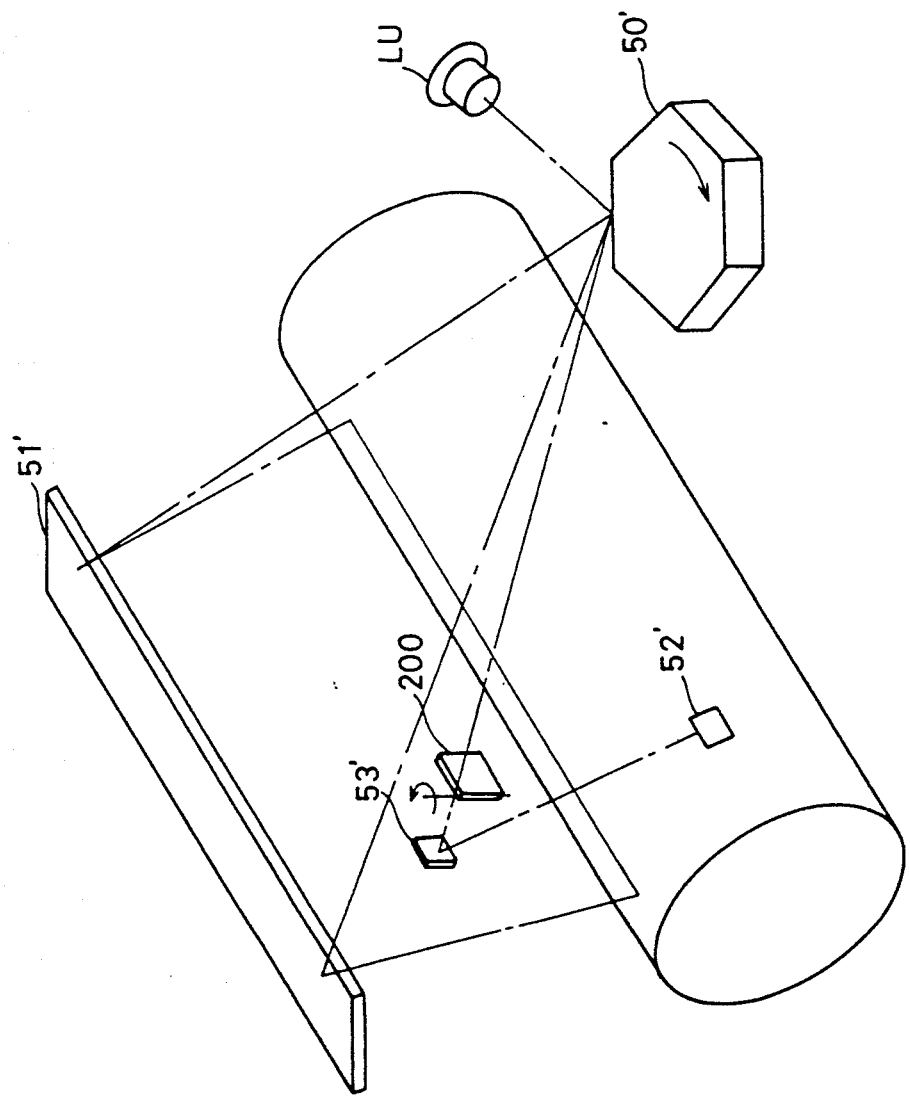
FIG. 10 is a perspective view showing a relationship between a scanning optical unit and a photoreceptor according to a second embodiment.
Figure 11:
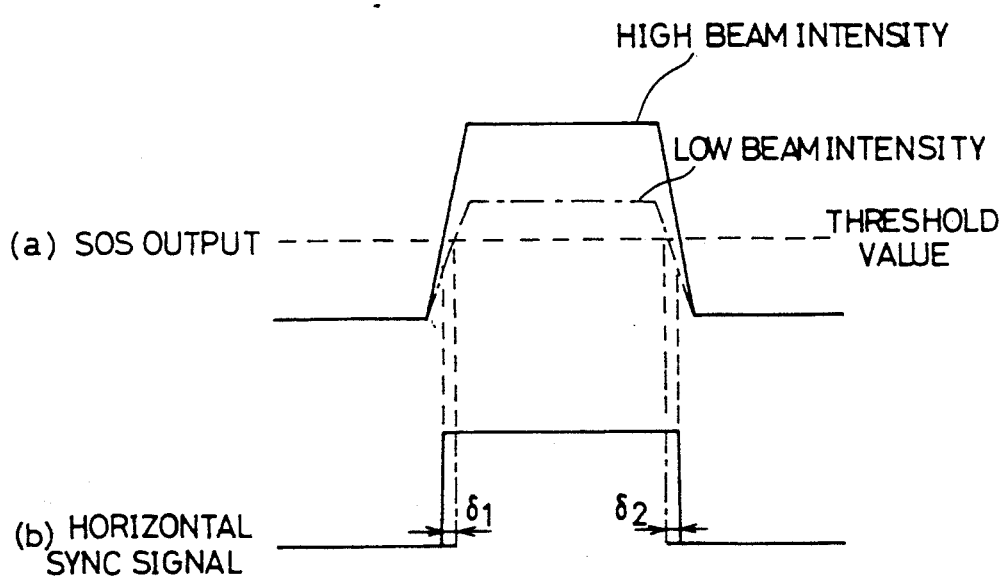
FIG. 11 is a diagram showing a deviation in a horizontal synchronizing signal due to a difference in intensities of beams incident on an SOS sensor.

In this embodiment, a filter 200 is provided on an optical path extending from a laser unit LU comprised of a laser diode and a collimator lens to an SOS sensor 52', as shown in FIG. 10. The filter 200 serves to attenuate the amount of light of a beam passing through the filter and is movable between a position where the filter enters into the optical path and a position where the filter saves from the optical path. The laser unit LU emits light in a first reference range being a lower beam intensity during high density printing, while it emits light in a second reference range being a higher beam intensity during low density printing. In high density printing, the filter 200 is located at the position where the filter saves from the optical path, and directly irradiates the SOS sensor 52' with the laser beam set in the first reference range. On the other hand, in low density printing, the filter 200 is located at the position within the optical path. The filter 200 first attenuates the intensity of the laser beam set to the intensity of the second reference range down to the intensity of the first reference range, which is the range set in high density printing, and then irradiates the SOS sensor 52' with the laser beam having the attenuated intensity. Thus, in any of the high density printing and the low density printing, the intensity of the beam irradiating the SOS sensor 52' is in the first reference range of a low intensity, and the beam intensity is constant. It is thus possible to carry out detection of the position to start image writing without any deviation in synchronization also in this embodiment similarly to the first embodiment.

While a method of rotating the filter 200 is adopted as a moving method allowing the filter 200 to save from the optical path of the beam in the second embodiment, any method allowing the filter 200 to save from the optical path of the beam may be adopted.

In addition, while the example in which the present invention is applied to the recording apparatus enabling an alteration of dot densities in the subscanning direction has been described in the first and second embodiments, the present invention is also applicable to a recording apparatus in which an alteration of dot densities can be made in both the subscanning direction and the main scanning direction and to a recording apparatus in which the dot density alteration can be made in only either the subscanning direction or the main scanning direction. The dot density alteration in the main scanning direction can be accomplished by alteration of a cycle for modulation of laser diodes, i.e., a frequency of a dot clock.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image forming apparatus, comprising:
   light radiating means for radiating a first beam and a second beam;
   deflection means for deflecting said first beam and said second beam toward a recording medium;
   light receiving means for detecting the beams deflected by said deflection means to output a synchronizing signal for starting modulation in accordance with image data of each of the beams;
   switching means for switching a first mode in which an image formation is carried out by use of said first beam and said second beam and a second mode in which an image formation is carried out by use of only said first beam; and
   control means for controlling so that said second beam is emitted when said second beam is deflected to a position of said light receiving means in said first mode and said second mode, and modulating said first beam and said second beam in said first mode in response to the synchronizing signal output from said light receiving means and modulating said first beam in said second mode.

2. The apparatus of claim 1, wherein
   the image formation in said first mode has a recording density higher than a recording density of the image formation in said second mode.

3. The apparatus of claim 2, wherein
   an intensity of each of said first beam and said second beam is at a first level in said first mode, and the intensity of said first beam is at a second level higher than said first level, while the intensity of said second beam is at said first level in said second mode.

4. The apparatus of claim 3, further comprising:
   driving means for detecting the respective intensities of said respective beams to drive said light radiating means so as to allow said beam intensities to be set in a predetermined range corresponding to the level of each said mode.

5. The apparatus of claim 4, wherein
   said driving means alters said beam intensities by stages, and said predetermined range is slightly smaller than a width of the beam intensity at a first stage altered by said driving means.

6. An image forming apparatus having an alterable image recording density, comprising:
   switching means for switching a first mode in which an image formation is carried out at a first recording density, and a second mode in which an image formation is carried out at a second recording density a half of said first recording density;
   first beam generating means for generating a first beam having a first intensity in said first mode and having a second intensity higher than said first intensity in said second mode;
   second beam generating means for generating a second beam of said first intensity;
   deflection means for deflecting said first beam and said second beam toward a recording medium;
   detecting means for detecting the beams deflected by said deflection means at a position different from a position of said recording medium;
   first control means for controlling so that said second beam is emitted when said second beam is deflected to a position of said detecting means; and
   second control means for modulating said first beam and said second beam in said first mode in accordance with image data and modulating only said first beam in said second mode, the modulation being started at timing based on the detection of said detecting means.

7. The apparatus of claim 6, wherein
   said first control means prevents emission of said first beam when said first beam is altered to said detecting position.

* * * * *